US009776600B2

(12) United States Patent
Belanger et al.

(10) Patent No.: US 9,776,600 B2
(45) Date of Patent: Oct. 3, 2017

(54) VEHICLE WASH COMPONENT WITH TORQUE REACTOR

(71) Applicant: WashMe Properties, LLC, Northville, MI (US)

(72) Inventors: Michael J. Belanger, Northville, MI (US); Barry S. Turner, Novi, MI (US); David L. Tognetti, Howell, MI (US); Mark D. Morin, Plymouth, MI (US)

(73) Assignee: WashMe Properties, LLC, Northville, MI (US)

( * ) Notice: Subject to any disclaimer, the term of this patent is extended or adjusted under 35 U.S.C. 154(b) by 26 days.

(21) Appl. No.: 14/691,686

(22) Filed: Apr. 21, 2015

(65) Prior Publication Data

US 2015/0274137 A1    Oct. 1, 2015

Related U.S. Application Data

(63) Continuation-in-part of application No. 14/327,744, filed on Jul. 10, 2014.

(Continued)

(51) Int. Cl.
*A46B 13/00* (2006.01)
*B60S 3/06* (2006.01)
*B60S 3/04* (2006.01)

(52) U.S. Cl.
CPC .............. *B60S 3/06* (2013.01); *A46B 13/008* (2013.01); *B60S 3/042* (2013.01); *A46B 2200/3046* (2013.01)

(58) Field of Classification Search
CPC .................. A46B 13/008; A46B 13/04; A46B 2200/3046; B60S 3/04; B60S 3/042; B60S 3/066; B60S 3/06; B60S 3/063

(Continued)

(56) References Cited

U.S. PATENT DOCUMENTS 2,716,767 A * 9/1955 Davis ...................... B60S 3/042
                                                        134/123
4,192,037 A * 3/1980 Capra ...................... B60S 3/042
                                                        15/53.4

(Continued)

FOREIGN PATENT DOCUMENTS

DE         3740627 A1    6/1989

OTHER PUBLICATIONS

International Search Report, Oct. 6, 2015, 3 pages.

*Primary Examiner* — Laura C Guidotti
(74) *Attorney, Agent, or Firm* — John S. Artz; Dickinson Wright PLLC

(57) ABSTRACT

A vehicle wash component for a vehicle wash system including a base portion, a rotatable stem portion in communication with the base portion, and a backing member in communication with the rotatable stem portion, which is configured to rotate about an axis of rotation. The backing member is linearly moveable with respect to the base portion between a first position away from a vehicle treatment area and a second position adjacent a vehicle treatment area. A plurality of media elements are secured to the backing member and configured to engage an exterior surface of a vehicle as the stem portion rotates. The plurality of media elements are constructed of a foam material that is configured to contact an exterior surface of a vehicle. The backing member is configured to linearly reciprocate with respect to the vehicle exterior during the vehicle wash process.

45 Claims, 7 Drawing Sheets

Related U.S. Application Data

(60) Provisional application No. 61/972,764, filed on Mar. 31, 2014, provisional application No. 61/972,854, filed on Mar. 31, 2014.

(58) Field of Classification Search
USPC .................... 15/28–29, 180, 53.1, 53.4, 97.3
See application file for complete search history.

(56) References Cited

U.S. PATENT DOCUMENTS

| | | | |
|---|---|---|---|
| 4,878,262 A | 11/1989 | Stufflebeam et al. | |
| 4,961,771 A * | 10/1990 | Brooke, Jr. | C03B 11/10 156/166 |
| 6,408,480 B1 * | 6/2002 | Wiemann | B24D 13/145 15/230.12 |
| 8,347,443 B1 | 1/2013 | Conrad | |
| 9,290,161 B2 * | 3/2016 | Belanger | B60S 3/042 |
| 2009/0241989 A1 | 10/2009 | MacNeil | |
| 2014/0150815 A1 * | 6/2014 | Chen | A46B 13/008 134/6 |

\* cited by examiner

VEHICLE WASH COMPONENT WITH TORQUE REACTOR

CROSS-REFERENCE TO RELATED APPLICATIONS

The continuation-in-part application claims priority to U.S. patent application Ser. No. 14/327,744, entitled "Pad for a Rotary Brush Vehicle Wash Component," which was filed on Jul. 10, 2014, which claims priority to U.S. Provisional Patent Application Ser. No. 61/972,764, entitled "Rotary Brush Apparatus for a Vehicle Wash System", which was filed on Mar. 31, 2014 and U.S. Provisional Patent Application Ser. No. 61/972,854, entitled "Rotary Brush Apparatus", which was filed on Mar. 31, 2014, the disclosures of which are all hereby incorporated by reference.

TECHNICAL FIELD

The present disclosure relates generally to a vehicle wash component for engaging and treating a vehicle exterior. More specifically, the present disclosure relates to a vehicle wash component employing a rotary brush that provides improved cleaning capabilities for a vehicle exterior that more accurately matches the contours thereof.

BACKGROUND FOR THE INVENTION

Rotary brush apparatuses are frequently used in vehicle wash systems for contacting, scrubbing, and cleaning exteriors of vehicles. These brushes typically include a rotary hub portion having an axis of rotation that is oriented generally parallel to a vehicle exterior and which includes a plurality of wash media elements that can extend outwardly from the hub portion. As the rotary hub rotates, the plurality of wash media elements extend generally outward due, in part, to centrifugal force, and can contact the vehicle exterior to remove dirt and debris and effectuate cleaning. To apply increased scrubbing and cleaning, the rotary hub can be rotated faster to increase the speed at which the media elements contact the vehicle exterior in order to generate more force to remove dirt. This generally creates an increased slapping noise due to the force of contact between the wash media elements and the vehicle and can make the car wash experience unenjoyable for a user. Also, as the speed of the brush increases, the perception of potential damage to the vehicle exterior increases.

Additionally, as most vehicle exteriors have non-planar or uneven surfaces, including on the lower or back part of the vehicle, the ability of these prior rotary brushes to adequately clean these surfaces can be limited. This is, in large part, because the wash media elements themselves are flexible and cannot apply sufficient force on the vehicle exterior to remove all dirt and debris. Accordingly, there remains a need for improvements in vehicle wash brush apparatuses to allow them to evenly scrub and clean such surfaces without the risk of scratching the vehicle exterior and which can accommodate non-planar surfaces.

SUMMARY OF THE INVENTION

It is therefore an aspect of the present disclosure to provide a rotary brush apparatus for a vehicle wash system that can provide improved cleaning, including for contoured surfaces and corners of a vehicle exterior.

It is another aspect of the present disclosure to provide a rotary brush apparatus for a vehicle wash system that is particularly suited for a vehicle exterior having non-planar or uneven surfaces.

It is still another aspect of the present disclosure to provide a rotary brush apparatus for a vehicle wash system that allows the brush to compensate for any unevenness in an exterior surface of the vehicle.

It is yet another aspect of the present disclosure to provide a rotary brush apparatus for a vehicle wash system that allows for linear movement between the brush and an exterior surface of a vehicle in the event torque being applied to the brush is too great.

It is still yet another aspect of the present disclosure to provide a rotary brush apparatus for a vehicle wash system that permits application of an increased force to an exterior surface of a vehicle without risking damage thereto.

It is still a further aspect of the present disclosure to provide a rotary brush apparatus for a vehicle wash system that minimizes damage to the wash component.

In accordance with the above and the other aspects, a vehicle wash component for treating an exterior surface of a vehicle is provided. The component includes a base portion disposable adjacent a vehicle treatment area. The base portion is in communication with a stem portion that is rotatable about an axis of rotation. A drive mechanism is in communication with the stem portion to effectuate rotation thereof about the axis of rotation. A backing portion is secured to the stem portion adjacent an inner end thereof. The backing portion includes a plurality of wash media elements secured thereto such that they extend from an outer face thereof in a generally perpendicular direction for treating the exterior surface of the vehicle. The stem portion is in communication with a torque resistor sleeve that allows relative linear movement of the stem portion toward and away from the vehicle exterior during operation.

BRIEF DESCRIPTION OF THE DRAWINGS

Other aspects of the present disclosure will be readily appreciated, as the same becomes better understood by reference to the following detailed description when considered in connection with the accompanying drawings wherein.

DETAILED DESCRIPTION OF THE DISCLOSURE

According to an aspect, the present disclosure relates to a treatment component for a vehicle wash system. The system may be configured as a tunnel car wash, where a vehicle is conveyed through the wash process by a conveyor or the like as is known in the art. Alternatively, the vehicle wash system may be configured as a roll-over type where the vehicle remains stationary and the various treatment components are translated and moved with respect to the vehicle to perform the vehicle wash process. Other suitable wash processes and systems may also be employed. According to an aspect, the vehicle wash system may be housed within a vehicle wash facility having an entrance end where a vehicle enters and an exit end where the vehicle leaves. It will be appreciated that the disclosed treatment component could also be employed in connection with a variety of other applications outside of a vehicle wash system.

According to a further aspect, the vehicle wash system may include a variety of vehicle wash components that engage and/or treat the exterior surface of a vehicle as it passes through the vehicle wash facility to effectuate a vehicle wash process. For example, the vehicle wash system can include a rinse arch, which sprays water or chemical onto a vehicle. The system can also include a bubble device that generates bubbles and emits them directly onto a vehicle exterior. An exemplary bubble device that may be employed with the disclosed system is described in Applicant's co-pending U.S. patent application Ser. No. 13/864,813, entitled "A Vehicle Wash Component for Emitting Bubbles", filed Apr. 17, 2013, the disclosure of which is hereby incorporated by reference. Other suitable devices for generating bubbles or foam may also be employed. The system can also include one or more top brushes for contacting a top exterior surface of the vehicle, a plurality of side brushes for contacting side exterior surfaces, and a plurality of wrap brushes for contacting both front and back surfaces of a vehicle. The system may also include wheel scrubbers for engaging vehicle wheels. The system can also include a drying section. According to a further aspect, the system can also include a wheel polishing device. It will be appreciated that more, less or different wash components may be employed. Additionally, multiples of the same components may be employed as desired. Further, the components may take on a variety of different configurations. Moreover, the order, placement and sequence of the components within the system may also vary. According to an aspect, the components may be designed to engage and/or treat a vehicle disposed within a vehicle treatment area of the vehicle wash facility.

Figure 1:
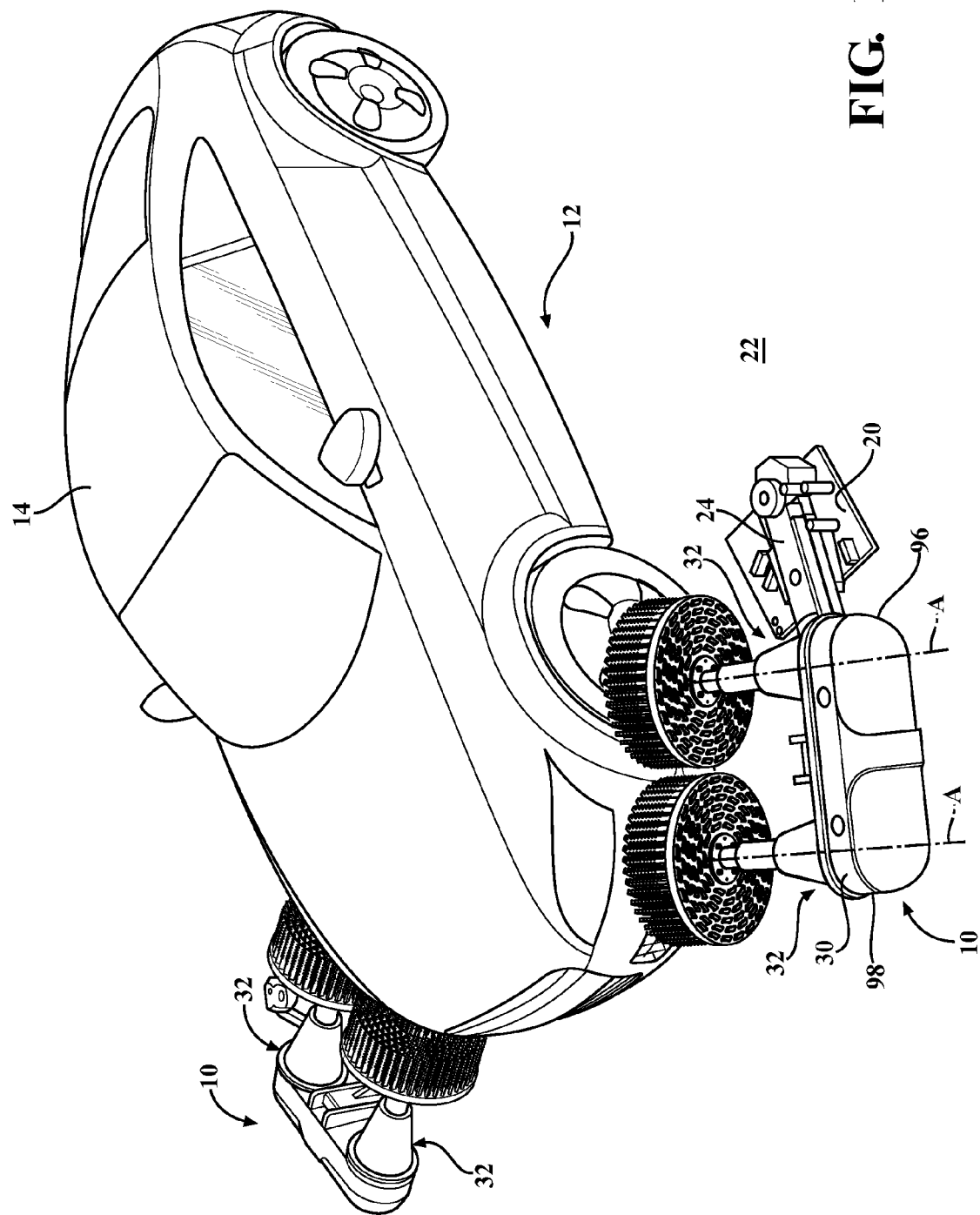
FIG. 1 is a perspective view of a pair of rotary brush assemblies in engagement with the side surfaces of a vehicle as part of a vehicle wash system according to an aspect of the present disclosure.

According to an aspect, the present disclosure relates to an improved vehicle wash component. As shown in FIG. 1, the vehicle wash component may be configured as a rotary brush 10 that is disposed adjacent a vehicle treatment area 12 of a vehicle wash system. According to another aspect, a separate rotary brush 10 can be provided on either side of the vehicle treatment area 12 to engage and treat opposite sides of a vehicle 14 passing through the vehicle treatment area 12. It will also be appreciated that the rotary brush 10 could be incorporated into a vehicle wash system to contact other surfaces of a vehicle exterior, including a front surface, a back surface, and a top surface.

Figure 2:
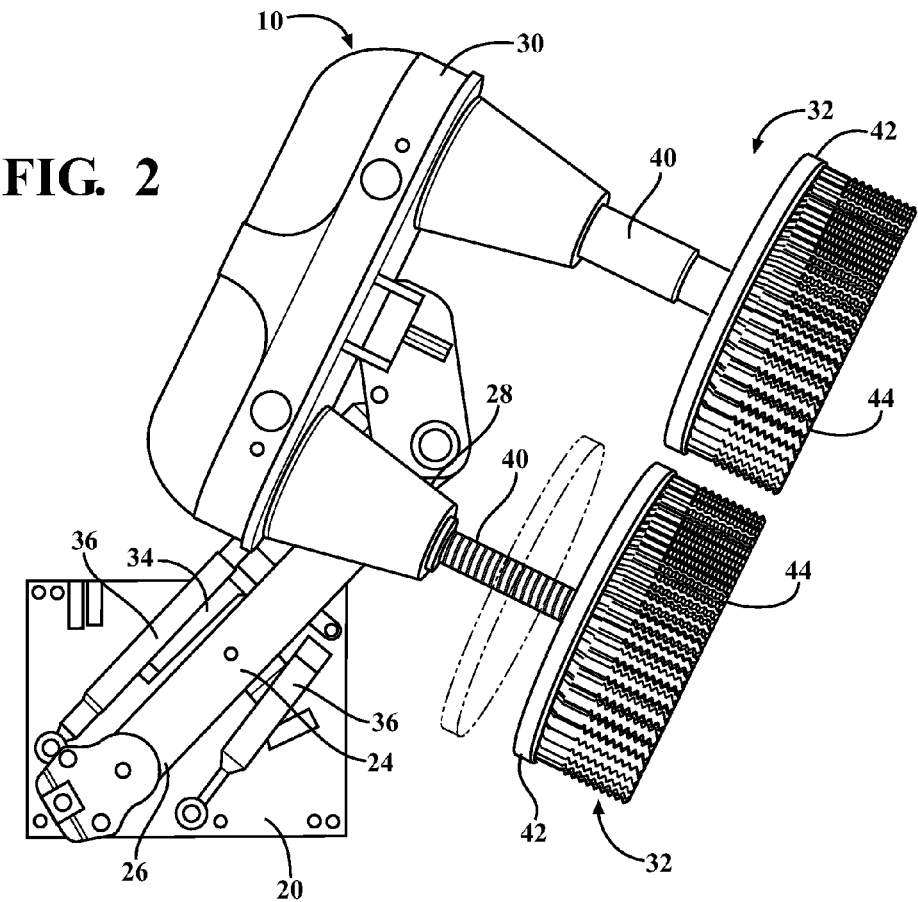
FIG. 2 is a top perspective view of a rotary brush assembly according to an aspect of the present disclosure.
Figure 3:
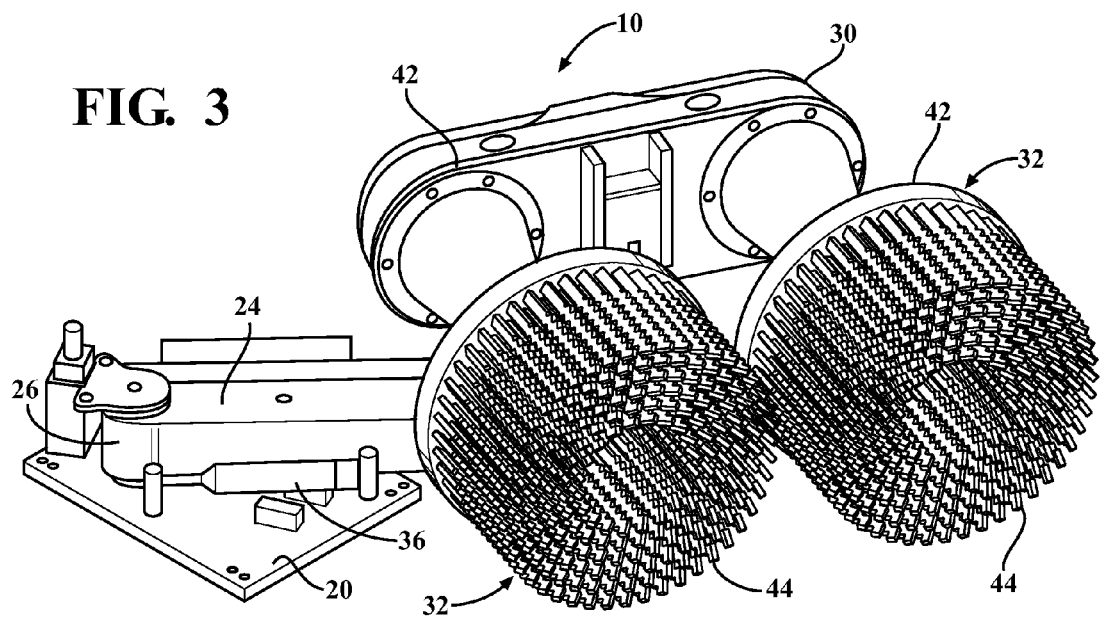
FIG. 3 is a front perspective view of a rotary brush assembly according to an aspect of the present disclosure.

According to an aspect and as shown in FIGS. 1 through 3, the rotary brush 10 can include a base portion 20 that is mounted on a floor 22 of the vehicle wash facility. It will be appreciated that the brush 10 could be mounted in a variety of ways and to different structures. The brush 10 may include a support arm 24 that is pivotally mounted to the base portion 20 at an outer end 26. The support arm 24 may have an inner end 28 located opposite the outer end 26 that is pivotally secured to a brush support portion 30. According to an aspect, the brush support portion 30 may have a pair of rotary brush assemblies 32 mounted thereto. It will be appreciated that only a single rotary brush assembly could be employed or more than two could be mounted to the brush support portion 30. It will be appreciated that the brush assemblies could have a variety of different arrangements.

An actuator 34 may be in communication with the support arm 24 to effectuate pivoting thereof about its outer end 26 under direction of a controller to move the rotary brush assemblies 30 toward and away from the vehicle treatment area 12 and into and out of communication with an exterior surface of a vehicle 14 under direction of a controller. According to another aspect, the controller could also be in communication directly with the brush support portion 30 to pivot the brush support portion 30 about a vertical axis so that each of the brush assemblies 32 may be located different distances from the vehicle exterior, as is discussed in more detail herein. A control cylinder 36 may also be employed to control movement of the support arm 24 so as to accommodate vehicles having different widths. As will be appreciated, the mechanism for moving the rotary brush assemblies 32 inwardly toward the vehicle treatment area 12 and outwardly away from the vehicle treatment area may be four-bar linkage system. However, a variety of other suitable mechanism may also be employed.

Figure 5:
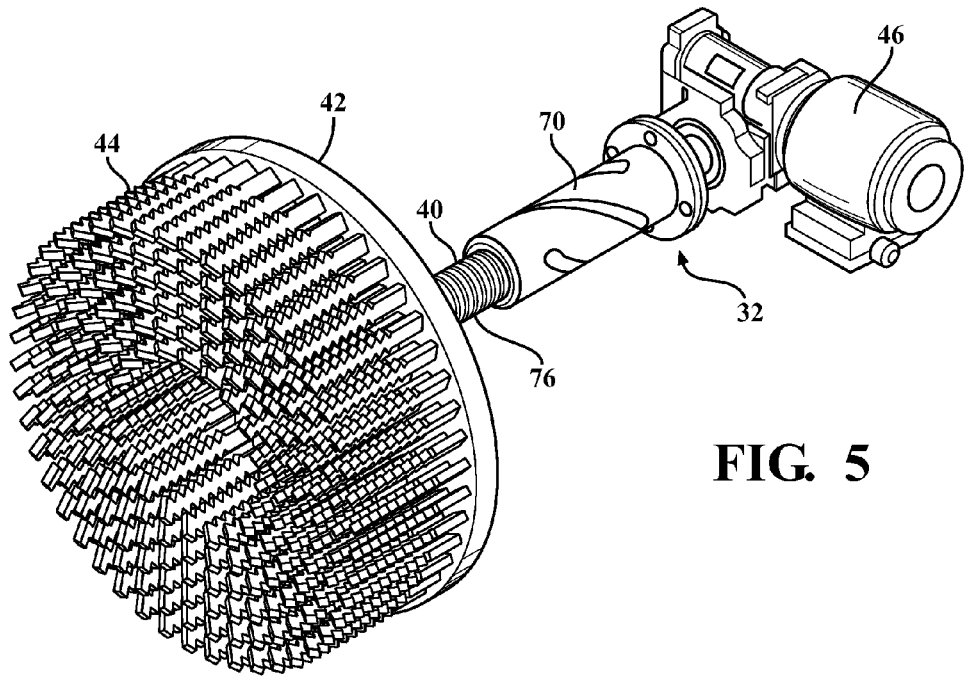
FIG. 5 is a front perspective view of a brush portion with attached motor assembly according to an aspect of the present disclosure.
Figure 6:
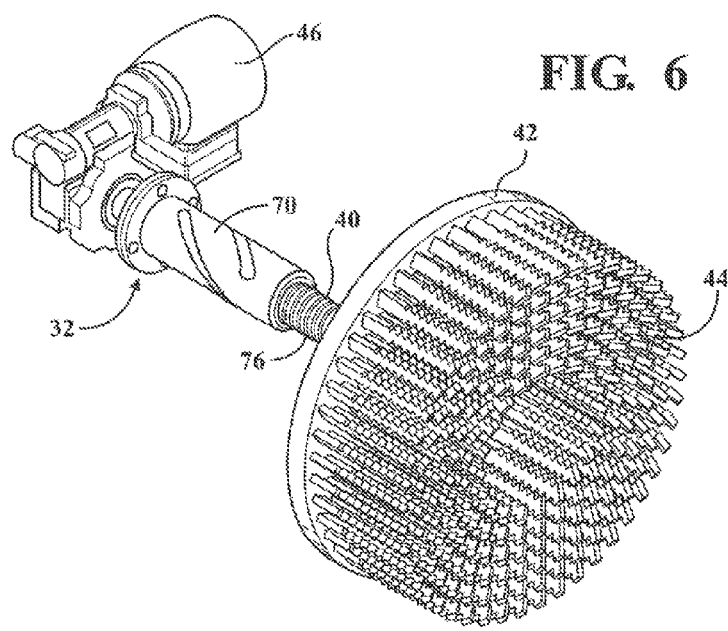
FIG. 6 is another front perspective view of the brush portion with attached motor assembly of FIG. 5.
Figure 7:
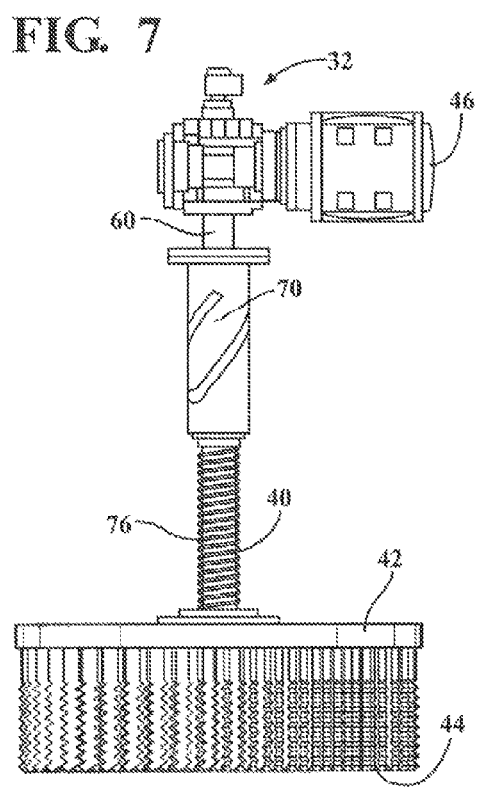
FIG. 7 is top view of the brush portion with attached motor assembly of FIG. 5.
Figure 8:
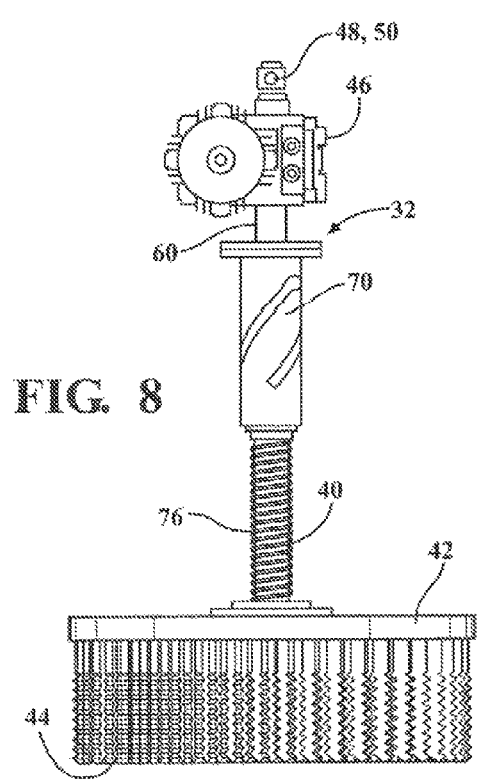
FIG. 8 is a side view of the brush portion with attached motor assembly of FIG. 5.
Figure 9:
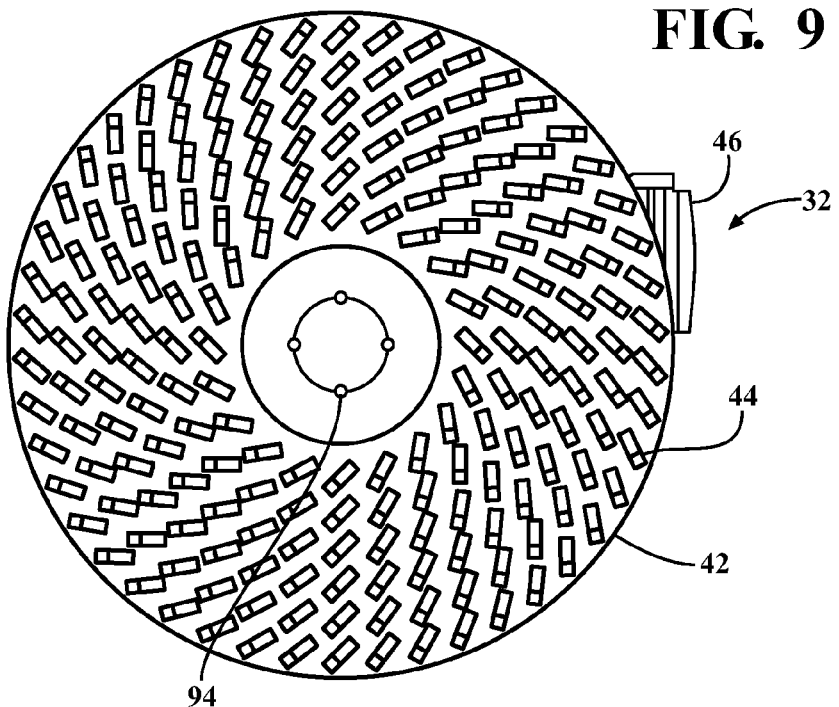
FIG. 9 is front view of the brush portion with attached motor assembly of FIG. 5.
Figure 10:
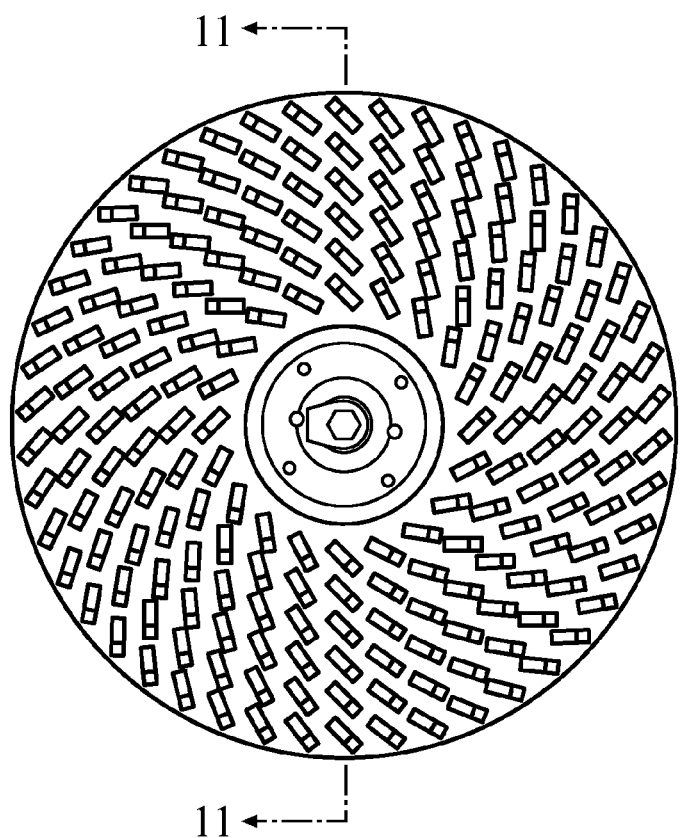
FIG. 10 is rear view of a brush portion of a rotary brush assembly according to an aspect of the present disclosure.

According to an aspect, the rotary brush assemblies 32 can include a stem portion 40, a brush backing portion 42 secured to the stem portion and a plurality of wash media elements 44. According to an aspect, each of the rotary brush assemblies 32 may include a motor 46 (FIG. 5) or other drive mechanism that effectuates rotation of each rotary brush assembly 32 about an axis of rotation. According to an aspect, the axis of rotation of each of the rotary brush assemblies 32 may be generally perpendicular to a vehicle exterior and also generally parallel to the floor 22 of the vehicle wash facility. This is contrasted with prior art brush assemblies where the axis of rotation of the brush assembly is parallel to a vehicle exterior. Additionally, as each rotary brush assembly 32 can operate under separate control and thus independently, they can be rotated in different directions and/or at different speeds. It will also be appreciated that the orientation of the axis of rotation can vary. It will also be appreciated that a single motor could also be configured to drive multiple brush assemblies.

According to a further aspect, each rotary brush assembly 32 may be in communication with a fluid supply. As shown, a source of fluid can be delivered to a respective fluid inlet 48, 50 or the brush support portion 30 such as by separate fluid lines (not shown) which are in communication with a fluid source (not shown). Alternatively, a single fluid line may be in communication with a manifold (not shown), which serves to deliver fluid to each of the rotary brush assemblies 32. According to an aspect, the fluid supply may be a source of soapy water. According to another aspect, a source of water and a chemical source can be delivered separately to the rotary brush assemblies. It will also be appreciated that a valve may be disposed between the forward brush assembly inlet 48 and the rearward brush assembly inlet 50 to regulate the flow of fluid and/or chemical to each of the rotary brush assemblies 32. As used herein, the directional terms "forward" and "rearward" are used for illustration only and are not intended to be limiting. Different chemicals could also be delivered to the different brush assemblies.

As shown and according to an aspect, the rotatable stem portion 40 may be in communication with the motor 46 such as through a drive shaft 60 and that actuation of the motor can effectuate rotation of the stem portion 40 about a horizontal axis of rotation A. As shown, according to an aspect, the axis of rotation may be oriented generally horizontally such that it is oriented generally perpendicularly to an exterior surface of the vehicle 14. As also shown, the axis of rotation may be oriented generally parallel to the floor 22 of the vehicle wash facility.

According to an aspect, the stem portion 40 can extend outwardly from the brush support portion 30. With particular reference to FIGS. 4 through 8, the stem portion 40 can have an inner end 52 and an outer end 54. The outer end 54 may be secured to a brush backing portion 42 by a mounting plate 56. The stem portion 40 may thus be fixedly secured to the brush backing portion 42 such that the brush backing portion 42 can rotate and move with the stem portion 40. According to an aspect, the stem portion 40 may be linearly reciprocal inwardly (toward the vehicle treatment area 12) and outwardly (away from the vehicle treatment area 12), as discussed in more detail below.

According to an aspect, the brush backing portion 42 may be formed of a soft flexible or pliable material such that it can move to accommodate different vehicle contours during operation, such as corners or tight areas. The flexibility of the brush backing portion 42 can provide significantly improved cleaning of a vehicle exterior during a vehicle wash process. According to another aspect, the brush backing portion 42 can be formed of a material that has memory. In other words, the brush backing portion 42 can be formed of a material that is flexible such that it can flex or move from a starting position, but has memory to return to the original position after it has been displaced. According to one aspect, the brush backing portion 42 may be formed of ethylene vinyl acetate ("EVA") material. It will be appreciated that the brush backing portion 42 can be formed of a variety of other suitable materials, including polyethylene foam. According to a still further aspect, the brush backing portion 42 may be formed by a variety of suitable process, including vacuum forming. Details of an exemplary brush backing portion may be found in Applicant's co-pending U.S. patent application Ser. No. 14/327,744, entitled "Rotary Brush Vehicle Wash Component", filed Jul. 10, 2014, which is hereby incorporated by reference. It will also be appreciated that the brush backing portion 42 could be constructed of a rigid material.

As shown, the brush backing portion 42 may be configured in the shape of a generally circular disk and may have a generally planar configuration. However, the brush backing portion 42 may have a variety of different shapes and may have other orientations, such as curved or non-planar. According to one aspect, the brush backing portion 42 may have a convex shape such that its middle portion is further inward than the outer periphery of the brush backing portion. Alternatively, it could have a concave shape. Additionally, the brush backing portion 42 may have a variety of different sizes. According to a further aspect, the brush backing portion 42 may be adaptable for a variety of different purposes or applications, including for floor cleaning, deck cleaning, boat cleaning or a variety of other suitable applications.

According to another aspect, the brush backing portion 42 may have a plurality of openings formed therein for accommodating attachment of a plurality of wash media elements 44 thereto. The openings may have a variety of different shapes, including circular. According to an aspect, the wash media elements 44 may be secured to the brush backing portion 42 via the openings. However, the media elements 44 may be secured to the brush backing portion 42 in a variety of different ways. Additionally, according to an aspect, the wash media elements 44 can have a variety of different shapes and sizes. Further, the wash media elements 44 can be formed of a variety of different materials and by a variety of different forming or manufacturing processes.

According to an aspect, the plurality of wash media elements 44 may be threaded or woven through a respective one of the plurality of openings to secure them to the backing member 42. It will be appreciated that the plurality of wash media elements 44 could be secured to the backing member 42 in a variety of different ways. It will also be appreciated that the openings may have a variety of different shapes, including circular. According to an aspect, the woven nature of the attachment of the wash media elements 44 to the backing member 42 can allow these components to be securely attached without any additional securing mechanism.

According to a further aspect, the wash media elements 44 may be configured such that they are substantially self-supporting and remain oriented substantially perpendicular to the backing member 42 during operation. In other words, according to an aspect, the wash media elements 44 may be constructed so as to retain their shape during rest and operation such that they do not sag or droop. According to this aspect, because the wash media elements 44 are self-supporting, they can exert a consistent pressure on the vehicle surface and make contact at more or less predetermined locations, regardless of the brush's rotational speed. This can provide more effective cleaning of the vehicle exterior. According to an aspect, the wash media elements 44 may be formed of a non-marring material that will not damage a painted exterior surface, such as a foam material, including an EVA. However, it will be appreciated that a variety of other suitable materials may be employed to form the media elements that will not scratch, mar or otherwise damage a painted surface of a vehicle. For example, instead of foam, a synthetic material may be employed such as is employed with plastic bristles. One of ordinary skill will understand that media elements configured as nylon bristles may alternatively be employed.

Figure 4:
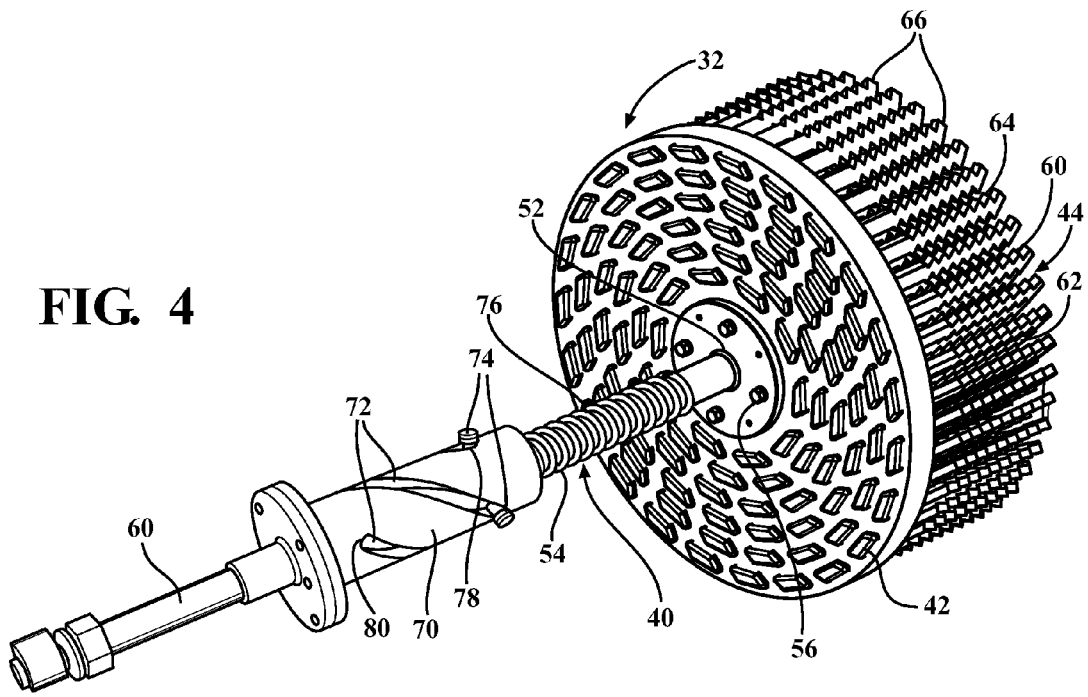
FIG. 4 is a rear perspective view of a brush portion of a rotary brush assembly according to an aspect of the present disclosure.

As shown best in FIG. 4, according to an aspect, the wash media elements 44 can have a first side 60, a second side 62 and an end portion 64. According to an aspect, each side portion 60, 62 may have a generally serrated shape including a plurality of teeth 66. It will be appreciated that instead of teeth a variety of other discontinuous structures may be employed, which can facilitate cleaning. According to an aspect, the discontinuous surface on either side 60, 62 of each wash media element 44 can provide improved cleaning of a vehicle exterior. According to another aspect, the end portion 64 can be pointed. It will be appreciated that the wash media elements 44 can have a variety of different shapes, sizes, and configurations. Further, the wash media elements 44 can be formed of a variety of different materials and by a variety of different forming or manufacturing processes. Additional details of an exemplary wash media element may be found in Applicant's co-pending U.S. patent application Ser. No. 14/327,744, entitled "Rotary Brush Vehicle Wash Component", filed Jul. 10, 2014, which is hereby incorporated by reference.

According to another aspect, the wash media elements 44 may be configured as individual quills that are attached to the brush backing portion 42 as separate elements. According to another aspect, the plurality of openings in the brush backing portion 42 may be uniformly spaced about the surface of the brush backing portion 42. According to an aspect, each of the quills could have an enlarged base portion that is generally circular in shape and which is configured to fit within one of the plurality of openings formed in the brush backing portion 42. According to a further aspect where the brush backing portion 42 is constructed of a memory material, the outer diameter of the quill base could be substantially the same as or even slightly greater than the diameter of the opening to allow each quill to be tightly fit into and secured within the opening. Obviously, other suitable arrangements and configurations of the quills and the openings may be employed. For example, the diameter of the opening in the brush backing portion 42 could be greater than outer diameter of the base of the quill.

According to an aspect, each quill could be formed as bristles of nylon or other synthetic material. For example, each of the individual strands that may be utilized to form the quills could be comprised of a thermophile material. According to another aspect, the individual strands could be formed of other softer structures, such as horse hair. According to still another aspect, the quills could be formed from a combination of synthetic and softer materials. Obviously, other suitable materials could be utilized either alone or in combination with other materials to form the quills. The quills could be configured such that they could be readily substituted for other quills attached to the brush backing portion 42 by removing the existing quill and inserting a new one into the opening.

According to another aspect of the present disclosure, the rotary brush assembly 32 can include a torque resistance sleeve 70. According to a further aspect, the torque resistance sleeve 70 can be disposed generally between the outer end 54 of the stem portion 40 and the brush support portion 30. The torque resistance sleeve 70 may have a plurality of helix slots 72 formed therein, which accommodate and allow pegs 74 secured to the stem portion 40 to travel or move therein between a slot inner end 78 and a slot outer end 80. A spring 76 can be disposed around the stem portion 40 and may be located between the brush backing portion 42 and the torque resistance sleeve 70. According to an aspect, the spring can bias the brush backing portion 42 inwardly toward the vehicle treatment area 12 so as to apply an inward force onto a vehicle exterior.

According to an aspect, the torque resistance sleeve 70 can allow the stem portion 40 to reciprocate therewithin such that the brush portion (the brush backing portion 42 and the media elements 44) may move inwardly (toward) and outwardly (away) from the vehicle treatment area during the treatment of a vehicle. This can allow the rotary brush assembly 32 to accommodate different vehicle surfaces having different contours and allow for efficient and effective cleaning of different sized and shaped vehicles. More specifically, according to an aspect, the stem portion 40 may move between a fully extended position where the pegs 74 are adjacent the slot inner end 78 and a fully retracted position where the pegs 74 are disposed adjacent the slot outer end 80.

In operation, the brush backing portion 42 may be biased inwardly for contacting a vehicle. During operation, torque can be applied to the brush due to its contact with a vehicle. This torque force can translate into a rotary force that causes the stem portion 40 to move outwardly (or deflect) away from the side of vehicle when the torque force becomes too great. According to an aspect, when this occurs, the brush portion can move outward and compress the spring 74. The stem portion 40 can be telescopically received within the torque resistance sleeve 70. As the stem portion 40 moves inward, the pegs 74 can linearly travel within the helical slots 72 to allow the stem portion 40 to reciprocate outwardly away from the vehicle treatment area 12. According to an aspect, the rotary brush assembly 30 may be configured to seek equilibrium between application of force on a vehicle exterior and minimize torque applied to the assembly. According to another aspect, each of the rotary brush assemblies 30 mounted to the brush support portion 32 may be operated independently such that one can reciprocate independently of the other. Put another way, each of the rotary brush assemblies can have their own independent suspension.

Figure 11:
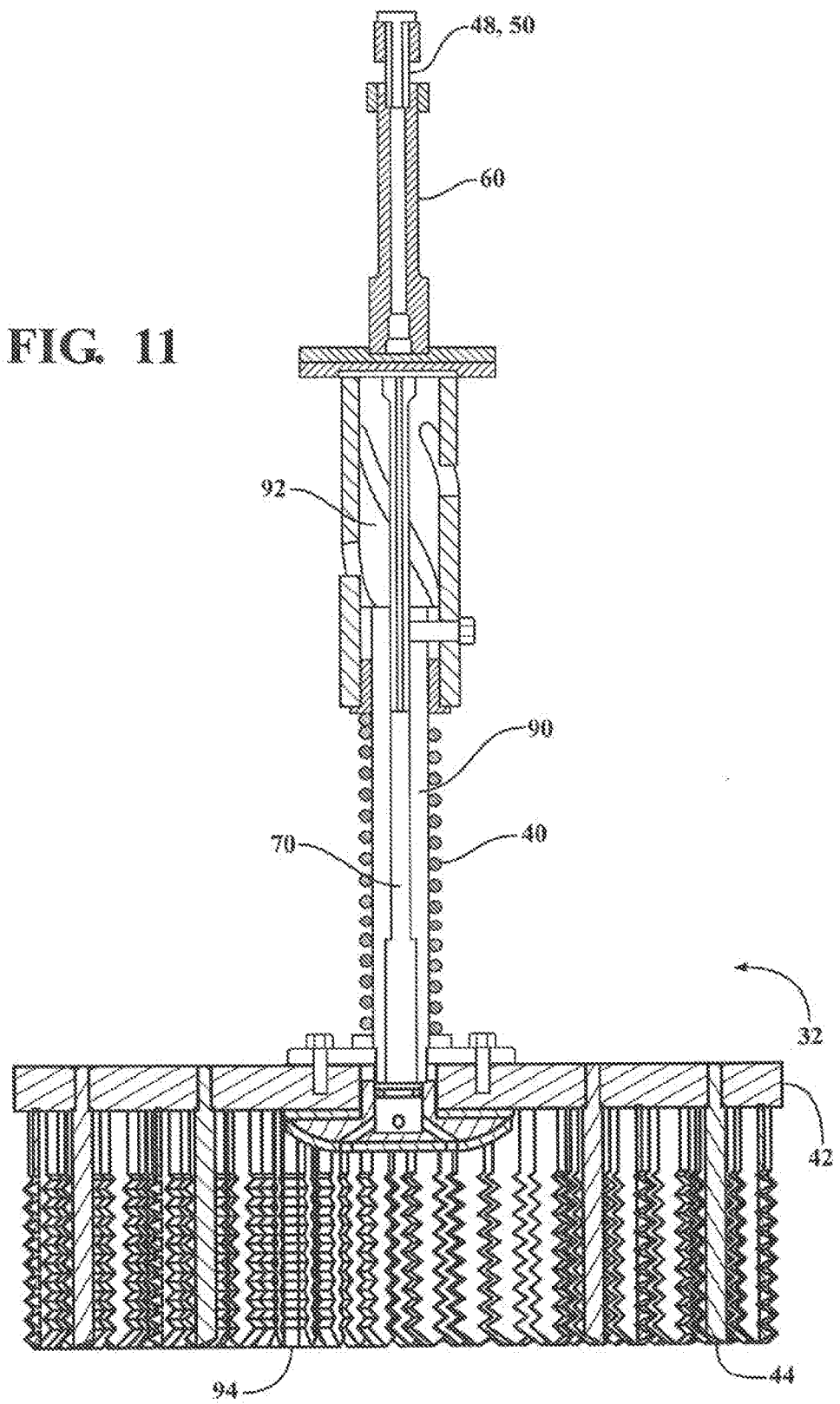
FIG. 11 is a cross-sectional view of the brush portion of FIG. 10 in the direction of the arrows 11-11.

According to an aspect and as shown in FIG. 11, the stem portion 40 can have a hollow interior 90. By this configuration, the fluid delivered to the rotary brush assembly 32 may pass from the fluid inlets 48, 50 through an interior 92 of the torque resistance sleeve 70 as well as the interior 90 of the stem portion 40 to the brush backing portion 42. The fluid may be passed through their interiors by an internal fluid line. According to an aspect, the brush backing portion 42 can include a plurality of fluid openings 94 that are in communication with the internal fluid delivery line such that fluid can be passed and emitted onto the front side of the brush backing portion 42 and into communication with the plurality of wash media elements 44 for application to a vehicle exterior. According to an aspect, the brush backing portion 42 can include four separate fluid openings 94 that are disposed adjacent a center portion of the brush backing portion 42. The utilization of multiple fluid openings can allow bubbles to cover substantially the entire front surface of the brush. However, it will be appreciated that more or less openings may be employed and that they may be disposed in different locations on the brush backing portion 42. According to an aspect, the openings 94 may be angled outwardly so that fluid emitted therefrom may be directed outwardly toward a periphery of the brush backing portion 42. The openings may be oriented to emit fluid in a variety of different directions.

According to an aspect, the internal fluid line can include or be in communication with a foam generation device such that as the fluid passes therethrough foam is generated, which is passed through the fluid openings 94 to the media elements. According to an aspect, the foam generation device may be a wash media element that communicates with soapy water or chemical being passed through the internal fluid line to generate foam. It will also be appreciated that a supply of compressed air could also be utilized to assist with the foam generation process.

According to an aspect, the generation of foam inside the rotary brush assembly 32 for use by the plurality of wash media elements 44 in treating an exterior surface of the vehicle can be highly advantageous. According to an aspect, the rotary brush assembly 32 may be configured such that foam covers the surface of the brush portion. As foam is applied to the vehicle, the foam can encapsulate the dirt. This can minimize any potential scratching of the vehicle surface as can occur with prior devices. Additionally, when the foam is rinsed off the vehicle, the dirt will more efficiently be removed from the vehicle surface.

According to another aspect mentioned above, the brush support portion 32 may be angled (pivoted about a vertical axis) such that a rearward end 96 is disposed closer to the vehicle treatment area 12 than a forward end 98. In other words, the brush support portion 32 may be biased to an angle with respect to the vehicle treatment area 12. By this configuration, a plane defined by the brush backing portion 42 may be oriented at an angle with respect to the vehicle treatment area and thus the exterior surface of the vehicle. It will be appreciated that the angle at which the brush support portion 30 can be biased may vary. According to one aspect, the angle of bias or pivot may be between 20 and 40 degrees with respect to the vehicle treatment area. According to an aspect, this can minimize the torque experienced by the rotary brush assemblies 32. This configuration can also allow the rotary brush assemblies to provide improved contact with a vehicle exterior, which is further enhanced by the ability of the rotary brush assemblies to move independently with respect to one another. While the brush support portion can be biased to a particular angle, the angle can change when it engages a vehicle surface.

Figure 12:
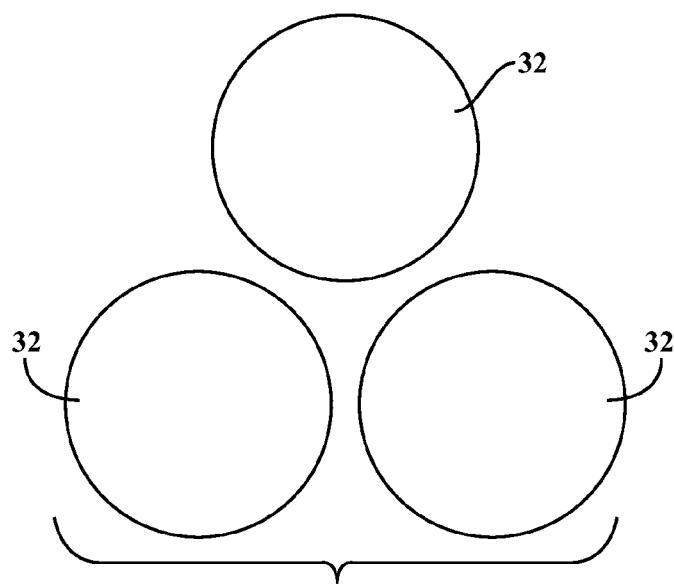
FIG. 12 is a schematic illustration of a brush assembly for a vehicle wash component according to another aspect of the present disclosure.
Figure 13:
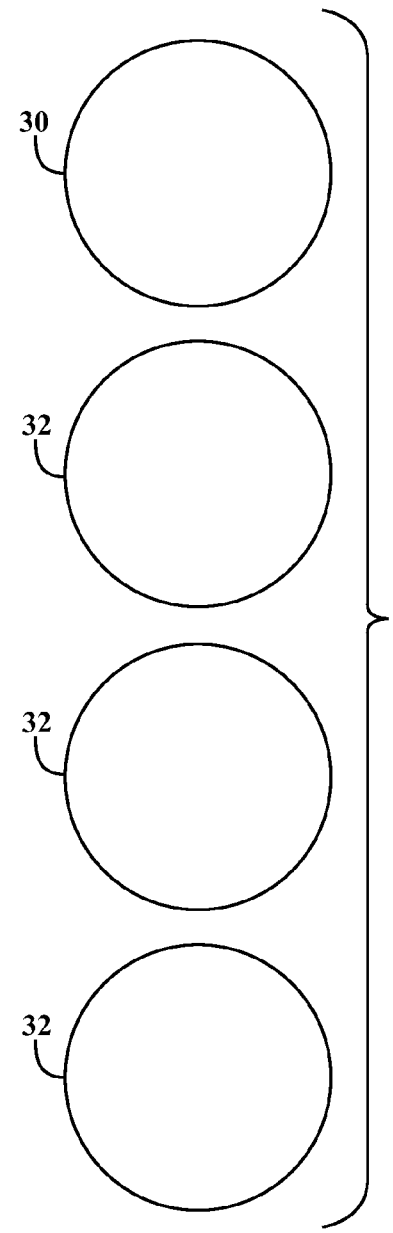
FIG. 13 is a schematic illustration of a brush assembly for a vehicle wash component according to still another aspect of the present disclosure.

According to an aspect, the rotary brush assemblies 32 can have different arrangements, including different numbers of individual assemblies. For example, the rotary brush assemblies 32 could be arranged in a generally triangular arrangement with one rotary brush assembly 32 located above two rotary brush assemblies 32, as schematically illustrated in FIG. 12. Alternatively, the brush assemblies could be arranged in a generally triangular arrangement with one rotary wheel disposed below two other rotary wheel assemblies. According to an aspect, each of the rotary brush assemblies 32 could be configured to operate independently with each of the brushes being able to rotate in different directions. According to still another aspect, the rotary brush assemblies 32 could be arranged vertically (one on top of the other) such as for treating a back of a vehicle, as schematically illustrated in FIG. 13.

According to an aspect, the rotary brush 10 may be configured to help treat the lower portion of a vehicle that is known to be challenging to treat. For example, the rotary brush 10 can be configured to engage rocker panels of a vehicle. In part because of the flexible brush backing portion 42, the wash media elements 44 can get into cracks, including interior door sills and remove dirt and debris therefrom. According to another aspect, the rotary brush 10 may be configured and employed in a manual self-serve wash where a user can turn on the system and manipulate it to clean the vehicle exterior.

Note that not all of the activities described above in the general description or the examples are required, that a portion of a specific activity may not be required, and that one or more further activities may be performed in addition to those described. Still further, the orders in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A vehicle wash component for a vehicle wash system, comprising:
    a base portion;
    a rotatable stem portion in communication with the base portion;
    a backing member in communication with the rotatable stem portion and configured to rotate therewith about an axis of rotation, the backing member being linearly moveable with respect to the base portion between a first position away from a vehicle treatment area and a second position adjacent a vehicle treatment area, the backing member further configured to rotate about a vertical axis;
    a plurality of media elements secured to the backing member and configured to engage an exterior surface of a vehicle as the stem portion rotates, the plurality of media elements being constructed of a foam material that is configured to contact an exterior surface of a vehicle;

whereby the backing member is configured to independently linearly reciprocate and rotate at an angle with respect to the vehicle exterior during the vehicle wash process.

2. The component of claim 1, further comprising:
a torque resistance sleeve which is configured to telescopically receive the rotatable stem portion therein as the rotatable stem portion moves outwardly away from the vehicle treatment area to accommodate different vehicle dimensions.

3. The component of claim 2, wherein the stem portion is in communication with a spring, which is configured to bias the stem portion inwardly toward the vehicle treatment area; and
wherein the stem portion is configured to move outwardly away from the vehicle treatment area when a force between the component and the exterior surface of the vehicle exceeds a predetermined threshold.

4. The component of claim 3, wherein the torque resistance sleeve includes a plurality of slots formed therein that receive corresponding pins disposed on the stem portion and which allow the stem portion to reciprocate outwardly away from and inwardly toward the vehicle treatment area during operation.

5. The component of claim 2, wherein the stem portion includes a hollow passageway formed through an interior thereof; and
wherein the hollow passageway is in communication with a fluid source to convey fluid from the fluid source to the backing member.

6. The component of claim 5, further comprising:
a foam generation mechanism disposed in the hollow passageway such that generated foam can be delivered to the backing member for application to the vehicle surface in the vehicle treatment area.

7. The component of claim 1, wherein the axis of rotation of the stem portion is oriented generally parallel to the ground.

8. The component of claim 7, wherein the axis of rotation of the stem portion is oriented at an angle of between 0 and 90 degrees with respect to a vehicle treatment area.

9. The component of claim 8, wherein the angle is approximately 30 degrees.

10. The component of claim 1, wherein the backing member is constructed of a flexible material.

11. The component of claim 1, wherein the plurality of media elements are formed of a non-abrasive material.

12. The component of claim 11, wherein the plurality of media elements are formed of an EVA material.

13. The component of claim 1, wherein the plurality of media elements are attached to secured to the backing member through a mechanical weave.

14. The component of claim 1, wherein the backing member has a generally circular shape.

15. The component of claim 1 wherein the backing member is constructed of a material with memory such that it can deflect and return to its original position.

16. A vehicle wash component for a vehicle wash system as recited in claim 1, wherein said backing member is configured to rotate about said vertical axis at an angle of from 20 to 40 degrees relative to a vehicle exterior.

17. A vehicle wash component for treating an exterior surface of a vehicle as part of a vehicle wash system, comprising:
a base portion disposable adjacent a vehicle treatment area;
a brush assembly in communication with the base portion and including:
a stem portion in communication with the base portion;
a drive mechanism in communication with the stem portion to effectuate rotation of the stem portion about an axis of rotation;
a backing member disposed adjacent an inner end of the stem portion;
a plurality of wash media elements secured to the backing member and spaced apart such that they extend perpendicularly from an outer face thereof when said stem portion is rotated by said drive mechanism for treating the exterior surface of the vehicle; and
a torque resistor sleeve in telescopic communication with an outer end of the stem portion to allow the stem portion to move toward and away from the vehicle, said stem portion being rotatable relative to said torque resistor sleeve.

18. The component of claim 17, wherein the stem portion is in communication with a spring, which is configured to bias the stem portion inwardly toward the vehicle treatment area; and
wherein the stem portion is configured to move outwardly away from the vehicle treatment area when a friction force between the plurality of media elements and the exterior surface of the vehicle exceeds a predetermined threshold.

19. The component of claim 18, wherein the torque resistance sleeve includes a plurality of arcuate slots that receive corresponding pins disposed on the stem portion and which allow the stem portion to reciprocate outwardly away from and inwardly toward the vehicle treatment area during operation.

20. The component of claim 17, wherein the axis of rotation of the stem portion is oriented generally perpendicular to the vehicle treatment area.

21. The component of claim 17, wherein the axis of rotation of the stem portion is oriented at an angle of between 0 and 90 degrees with respect to a vehicle treatment area.

22. The component of claim 21, wherein the angle is approximately 30 degrees.

23. The component of claim 17, wherein the stem portion includes a hollow passageway formed through an interior thereof; and
wherein the hollow passageway is in communication with a fluid source to convey fluid from the fluid source to the backing portion.

24. The component of claim 23 further comprising a foam generation mechanism disposed in the hollow passageway such that foam can be delivered to the backing portion for use in the vehicle treatment area.

25. The component of claim 17, wherein the first backing portion is constructed of a material with memory such that it can deflect and return to its original position.

26. The component of claim 17, further comprising:
a second brush assembly in communication with the base portion.

27. The component of claim 26, wherein the second brush assembly is disposed in a horizontal plane that is different from a horizontal plane in which the first brush assembly resides.

28. The component of claim 27, further comprising:
a third brush assembly disposed on the base portion, and located in a different horizontal plane from the first brush assembly and the second brush assembly.

29. The component of claim 28, wherein the first brush assembly, the second brush assembly and the third brush assembly are oriented generally in a triangular pattern.

30. The component of claim 26, wherein the second brush assembly is disposed in a horizontal plane that is the same as a horizontal plane in which the first brush assembly resides.

31. The component of claim 26, wherein the second brush assembly includes a stem portion that is communication with a separate drive mechanism, which is configured to rotate the stem portion of the second brush assembly in a direction opposite to the direction of the stem portion of the first brush assembly.

32. The component of claim 26, wherein the second brush assembly includes a stem portion that is configured to reciprocate linearly with respect to the base portion.

33. The component of 32, wherein the stem portion of the first brush assembly is configured to reciprocate linearly with respect to the base portion; and
wherein the first stem portion and the second stem portion are configured to reciprocate independently of one another.

34. The component of claim 17, wherein the brush assembly is configured to be disposed in a tunnel vehicle wash facility.

35. The component of claim 17, wherein the brush assembly is configured to be disposed in a rollover vehicle wash facility.

36. The component of claim 17, wherein the brush assembly is configured to be disposed in a self-serve wash facility.

37. A vehicle wash component for treating an exterior surface of a vehicle as part of a vehicle wash system, comprising:
a base portion disposable adjacent a vehicle treatment area;
a first brush assembly in communication with the base portion, the first brush portion including a first rotatable stem portion, a first backing member secured to the first stem portion, and a plurality of first wash media members secured to the first backing member and configured to engage a vehicle exterior in the vehicle treatment area;
a second brush assembly in communication with the base portion, the second brush portion, including a second rotatable stem portion, a second backing member secured to the second stem portion, and a plurality of second wash media members secured to the second backing member and configured to engage a vehicle exterior in the vehicle treatment area;
wherein the first brush assembly is configured to linearly reciprocate toward and away from the vehicle treatment area;
wherein the second brush assembly is configured to linearly reciprocate toward and away from the vehicle treatment area;
wherein the linear movement of the second brush assembly is independent of the first brush assembly.

38. A vehicle wash component for treating an exterior surface of a vehicle as part of a vehicle wash system as recited in claim 37, further comprising for each rotatable stem portion a torque resistance sleeve which is configured to telescopically receive the rotatable stem portion therein as the rotatable stem portion moves outwardly away from a vehicle exterior to accommodate different vehicle dimensions.

39. A vehicle wash component for treating an exterior surface of a vehicle as part of a vehicle wash system as recited in claim 38, wherein each of said rotatable stem portions is in communication with a spring, which is configured to bias said stem portion inwardly toward a vehicle exterior, and wherein said stem portion is configured to move outwardly from a vehicle exterior when a force between said component and a vehicle exterior exceeds a predetermined threshold.

40. A vehicle wash component for treating an exterior surface of a vehicle as part of a vehicle wash system as recited in claim 39, wherein said torque resistance sleeve includes a plurality of slots formed therein that receive corresponding pins disposed on said stem portion and which allow said stem portion to reciprocate outwardly away from and inwardly toward a vehicle exterior during operation.

41. A vehicle wash component for treating an exterior surface of a vehicle as part of a vehicle wash system as recited in claim 39, wherein each of said backing members is configured to rotate about a vertical axis thereby permitting said backing member to be angled relative to a vehicle exterior to accommodate different vehicle exterior shapes.

42. A vehicle wash component for treating an exterior surface of a vehicle as part of a vehicle wash system as recited in claim 41, wherein each of said backing members is configured to rotate about a vertical axis at an angle of from 20 to 40 degrees relative to a vehicle exterior.

43. A vehicle wash component for treating an exterior surface of a vehicle as part of a vehicle wash system as recited in claim 37, wherein each of said brush assembly stem portions is independently rotatable relative to each other.

44. A vehicle wash component for treating an exterior surface of a vehicle as part of a vehicle wash system as recited in claim 37, wherein each of said stem portions includes a hollow passageway formed through an interior thereof; and
wherein said hollow passageway is in communication with a fluid source to convey a fluid from said fluid source to said backing member.

45. A vehicle wash component for treating an exterior surface of a vehicle as part of a vehicle wash system as recited in claim 44, further comprising a foam generation mechanism disposed in said hollow passageway such that generated foam can be delivered to said backing member for application to a vehicle exterior in a vehicle treatment area.

* * * * *